Dec. 10, 1946.  E. W. MARTIN  2,412,409
LOCK NUT AND METHOD OF ASSEMBLYING SAME
Filed Feb. 17, 1943
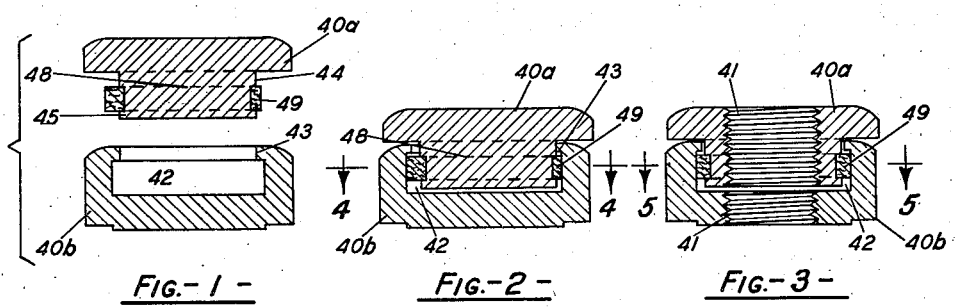
FIG.-1-  FIG.-2-  FIG.-3-
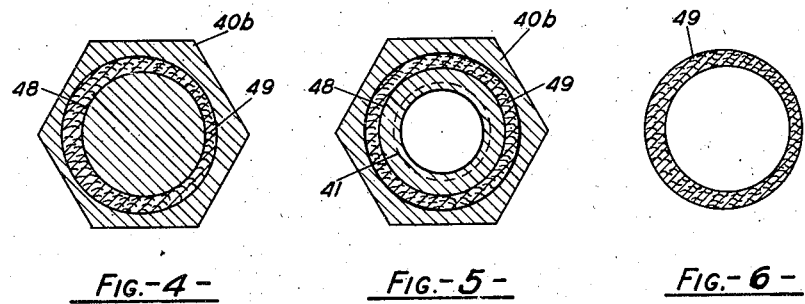
FIG.-4-  FIG.-5-  FIG.-6-
EUGENE W. MARTIN,
INVENTOR.
BY
ATTORNEY.

Patented Dec. 10, 1946

2,412,409

UNITED STATES PATENT OFFICE 2,412,409

LOCK NUT AND METHOD OF ASSEMBLING SAME

Eugene W. Martin, Denver, Colo.

Application February 17, 1943, Serial No. 476,137

4 Claims. (Cl. 151—19)

This invention relates to lock nuts and methods of assembling same, and more particularly relates to improvements in lock nuts of the general type shown and described in Nicholay Patent No. 2,301,634, issued November 10, 1942, for Lock nut.

The lock nuts shown in the aforesaid patent employ a means for holding the nut members against relative movement while they are applied to a bolt or the like. However, it frequently is necessary to remove or adjust the positions of the nuts after having been locked and difficulties often arise due to "back-locking" in the attempted reversing action.

It is an object of the present invention to provide a simple, durable and efficient lock nut, the individual members of which are joined together and held for limited relative movement to attain the desired locking action.

Another object of the invention is to provide simple and efficient methods of assembling lock nuts preparatory to use.

A further object of the invention is to provide an eccentric lock nut in which one member can be moved relative to another for a distance sufficient to attain the desired action but which is difficult to turn in a reverse direction to lock said members.

Other objects reside in novel details of construction and novel combinations and arrangements of parts, all of which will be described in the course of the following description.

To afford a better understanding of the invention, reference will be made to the accompanying drawing illustrating the invention. In the drawing, in the several views of which like parts have been designated similarly, Figure 1 is a vertical section through the two nut members of a form of a lock nut embodying features of the present invention, prior to their being tapped and joined;

Figure 2 is a vertical section through the nut members of Figure 1 illustrating an initial stage in the assembly;

Figure 3 is a section similar to Figure 2 and illustrating a final stage in the assembly;

Figure 4 is a section taken along the line 4—4, Figure 2;

Figure 5 is a section taken along the line 5—5, Figure 3; and

Figure 6 is an insert member used in the assembly of Figure 3.

Figs. 1 to 6, inclusive, illustrate a preferred form of the invention. The lock nut of this invention comprises complementary members 40a and 40b, which are initially formed as illustrated in Figure 1. Nut member 40a has a depending skirt 44 concentric with its lengthwise axis and an annular groove 48 on said skirt provides a flange portion 45 at its lower end.

Nut member 40b has a cylindrical recess 42 concentric with its lengthwise axis and the entrance 43 to said recess is of slightly less diameter than the diameter of flange 45 of nut member 40a.

After being so formed, a band or insert 49 of yieldable material, such as fiber, rubber or equivalent synthetic composition, is forced onto skirt 44 and seats in groove 48. The shape of insert 49 is clearly shown in the plan view, Figure 6.

Thereafter, nut members 40a and 40b are fixedly or permanently joined by expanding entrance 43 or contracting flange 45 to attain the position indicated in Figure 2. In this action, the insert member 49 is pressed through the entrance 43 and due to its yieldable character, passes through said entrance without excessive deformation. Because of the eccentric relationship of insert 49 to recess 42 and skirt 44, the lengthwise axes of the nut members are held out of alinement as clearly shown in Figure 2.

The members are next brought into alinement through the use of suitable tools and while so held are tapped and threaded, with the threaded bore 41 of this form concentric with the lengthwise axes of the respective nut members. Upon removal from the members, the insert 49 will cause a slightly offset relation between said members. However, when the lock nut is applied to the thread of a bolt or the like, the tool used for turning the nut moves them into coaxial relationship permitting easy threading on the bolt. When the desired position has been attained the tool is withdrawn, whereupon the insert exerts sufficient lateral movement to produce a slightly offset relationship which binds the members against conjoint movement along the thread under the influence of vibration or similar causes.

It will be apparent from the foregoing description that in the lock nut of the invention, the respective nut members are assembled by moving a wider skirt portion on one member into a recess on another member having a narrower entrance through temporarily imparting different relative dimensions to said nut members, and then causing them to resume their normal dimensional relationship to provide a fixed or permanent union.

Likewise, there is a concentric-eccentric relationship between the threaded bore and one or more adjoining parts of the respective nut members, which produces forces directed laterally of the bolt to effect a binding engagement of the nut members.

The lock nut design illustrated in the drawing is intended merely as a typical embodiment of the invention and it will be apparent from an examination thereof that other structural forms may be provided utilizing the novel features described herein within the spirit and scope of the invention.

While metals will be most satisfactory for most purposes in forming nut members embodying features of the present invention, it will be understood that for some purposes synthetic compositions, such as plastics, may be utilized in place of metals, and where such materials are used, the pressing method of assembly will be most satisfactory.

The degree of eccentricity incorporated into the designs is largely a matter of individual preference, and in practice it has been found that even a relatively slight eccentric relationship will provide a positive locking action.

While the invention has been illustrated in its use on a bolt, it will be understood that the lock nuts of the present invention can be installed on any type of a threaded member, and positively locked in or out of engagement with some other member on the threaded member. Consequently, the expression "on a bolt or the like" has been employed in the specification to designate the variety of uses for which the present invention is intended.

Changes and modifications may be availed of within the spirit and scope of the invention as defined in the hereunto appended claims.

What I claim and desire to secure by Letters Patent is:

1. A lock nut comprising two nut members having internally threaded bores adapted for coaxial alinement on the thread of a bolt or the like, one said member having a recessed portion comprising a cylindrical socket section and a cylindrical entrance portion of lesser diameter than the socket portion and out of axial alinement with said threaded bore, the other said member having a cylindrical skirt portion terminating at its outer end in a cylindrical flanged portion out of axial alinement with the threaded bore and of greater diameter than said entrance portion, the members being assembled with the flanged portion of the skirt extending through the narrower entrance portion and into the socket portion of the other said member, whereby said members may be rotated conjointly in permanently attached relation along the thread of a bolt and rotated independently at any selected position on said thread to lock the assembly against further movement thereon, and resilient means on said skirt portion arranged to be compressed by said socket member when the members are rotated independently to hold said members against relative rotational movement.

2. A lock nut, as defined in claim 1 in which the threaded bores of said members are concentric with the bolt and the recess and flanged portion are eccentric thereto.

3. A lock nut, as defined in claim 1 in which the threaded bores are eccentric to the bolt and the recess and flanged portion are concentric therewith.

4. A lock nut as defined in claim 1, in which said skirt portion is provided with a peripheral groove for receiving said resilient means.

EUGENE W. MARTIN.